United States Patent
Venkatraman et al.

(10) Patent No.: US 11,940,285 B2
(45) Date of Patent: *Mar. 26, 2024

(54) TECHNIQUES FOR ROUTE SELECTION

(71) Applicant: QUALCOMM Incorporated, San Diego, CA (US)

(72) Inventors: Sai Pradeep Venkatraman, Santa Clara, CA (US); Meghna Agrawal, Cupertino, CA (US); Weihua Gao, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 7 days.

This patent is subject to a terminal disclaimer.

(21) Appl. No.: 17/648,407

(22) Filed: Jan. 19, 2022

(65) Prior Publication Data

US 2022/0146273 A1  May 12, 2022

Related U.S. Application Data

(63) Continuation of application No. 15/978,408, filed on May 14, 2018, now Pat. No. 11,293,769.

(51) Int. Cl.
G01C 21/34 (2006.01)
(52) U.S. Cl.
CPC .................. *G01C 21/3446* (2013.01)
(58) Field of Classification Search
CPC ................. G01C 21/3461; G01C 21/3446
See application file for complete search history.

(56) References Cited

U.S. PATENT DOCUMENTS

| 5,220,507 A | 6/1993 | Kirson |
| 6,047,234 A | 4/2000 | Cherveny et al. |
| 8,478,515 B1 | 7/2013 | Foucher et al. |
| 8,655,378 B1 | 2/2014 | Crossno et al. |
| 9,031,782 B1 | 5/2015 | Lemay et al. |

(Continued)

FOREIGN PATENT DOCUMENTS

WO   WO-2020167615 A1   8/2020

OTHER PUBLICATIONS

International Search Report and Written Opinion—PCT/US2019/031195 ISA/EPO—dated Aug. 21, 2019.

(Continued)

*Primary Examiner* — Stephen Holwerda
(74) *Attorney, Agent, or Firm* — QUALCOMM Incorporated

(57) ABSTRACT

Methods and apparatus for route selection to a destination may include receiving a starting point and one or more destinations, and transmitting a request to a server for routes associated with the starting point and the one or more destinations. Additionally, the methods and apparatus may include receiving, from the server, a plurality of routes to the one or more destinations. Furthermore, the methods and apparatus may include selecting a route from the plurality of routes based at least on one or more reliability parameters associated with each route of the plurality of routes, the one or more reliability parameters comprising a likelihood of determining a position location along each route, the likelihood being based at least on detectability of features in each route by one or more object detection modalities.

30 Claims, 8 Drawing Sheets

(56) References Cited

U.S. PATENT DOCUMENTS

| | | | |
|---|---|---|---|
| 11,293,769 B2* | 4/2022 | Venkatraman | G01C 21/3446 |
| 2003/0151664 A1* | 8/2003 | Wakimoto | G01C 21/3602 |
| | | | 382/104 |
| 2004/0243303 A1* | 12/2004 | Padmanabhan | G01C 21/20 |
| | | | 701/408 |
| 2006/0147088 A1* | 7/2006 | Han | G05D 1/0278 |
| | | | 701/472 |
| 2007/0078596 A1* | 4/2007 | Grace | G01C 21/3644 |
| | | | 701/533 |
| 2008/0319659 A1 | 12/2008 | Horvitz et al. | |
| 2011/0208416 A1 | 8/2011 | Speier et al. | |
| 2012/0059578 A1* | 3/2012 | Venkatraman | G01S 19/396 |
| | | | 701/411 |
| 2014/0022121 A1* | 1/2014 | Donovan | G01S 19/49 |
| | | | 342/357.49 |
| 2014/0025286 A1 | 1/2014 | Donovan et al. | |
| 2017/0046580 A1* | 2/2017 | Lu | G06V 10/462 |
| 2018/0094943 A1* | 4/2018 | Grochocki, Jr. | G01C 21/3492 |
| 2019/0346274 A1 | 11/2019 | Venkatraman et al. | |

OTHER PUBLICATIONS

International Preliminary Report on Patentability—PCT/US2019/031195, The International Bureau of WIPO—Geneva, Switzerland, dated Nov. 26, 2020.

* cited by examiner

TECHNIQUES FOR ROUTE SELECTION

RELATED APPLICATIONS

This application is a continuation of and claims the benefit of priority to U.S. application Ser. No. 15/978,408 filed May 14, 2018 entitled "TECHNIQUES FOR ROUTE SELECTION", and issued as U.S. Pat. No. 11,293,769 on Apr. 5, 2022, which is assigned to the assignee hereof and incorporated herein by reference in its entirety.

FIELD

This disclosure relates generally to methods, devices, and computer readable medium for route selection techniques and more particularly to methods and apparatuses for selecting a route to enable advanced driver assistance systems and autonomous systems including self-driving vehicles.

BACKGROUND

Current route selection techniques rely on distance between the origin and destination and more recently traffic has been used to select a route between the origin and destination that optimizes time to destination. This is beneficial for humans because it minimizes the amount of time they are required to drive and humans can handle any unexpected events that occur while they are driving.

However, as advanced driver assistance system (ADAS), including self driving vehicles, become more prevalent they may not be able to handle all unexpected events that may occur while driving. For example, unexpected road closures, an abundance of large vehicles, obstructions in the road, etc can all cause problems for these systems. This becomes a bigger problem if these systems are unable to adapt to these dynamic changing environments.

Furthermore, ADAS capabilities may vary based on hardware and software requirements. For example, more capable systems may include or be equipped with wireless functionality, such as cellular vehicle to infrastructure equipment (C-V2X), but less capable systems may not have this functionality.

SUMMARY

An example of a method for route selection to one or more destinations may include receiving a starting point and the one or more destinations; transmitting a request to a server for routes associated with the starting point and the one or more destinations; receiving, from the server, a plurality of routes to the one or more destinations; and selecting a route from the plurality of routes based at least on one or more reliability parameters associated with each route of the plurality of routes, the one or more reliability parameters comprising a likelihood of determining a position location along each route, the likelihood being based at least on detectability of features in each route by one or more object detection modalities.

An example of a device for route selection to one or more destinations may include a memory, one or more transceivers configured to receive a starting point and the one or more destinations, and one or more processors coupled to the memory and the one or more transceivers, the one or more processors configured to: transmit a request to a server for routes associated with the starting point and the one or more destinations; receive, from the server, a plurality of routes to the one or more destinations; and select a route from the plurality of routes based at least on one or more reliability parameters associated with each route of the plurality of routes, the one or more reliability parameters comprising a likelihood of determining a position location along each route, the likelihood being based at least on detectability of features in each route by one or more object detection modalities.

An example of a device for route selection to one or more destinations may include means for receiving a starting point and the one or more destinations; means for transmitting a request to a server for routes associated with the starting point and the one or more destinations; means for receiving, from the server, a plurality of routes to the one or more destinations; and means for selecting a route from the plurality of routes based at least on one or more reliability parameters associated with each route of the plurality of routes, the one or more reliability parameters comprising a likelihood of determining a position location along each route, the likelihood being based at least on detectability of features in each route by one or more object detection modalities.

An example non-transitory computer-readable apparatus may include a storage medium including processor-executable program code configured to cause one or more processors to: receive a starting point and one or more destinations; transmit a request to a server for routes associated with the starting point and the one or more destinations; receive, from the server, a plurality of routes to the one or more destinations; and select a route from the plurality of routes based at least on one or more reliability parameters associated with each route of the plurality of routes, the one or more reliability parameters comprising a likelihood of determining a position location along each route, the likelihood being based at least on detectability of features in each route by one or more object detection modalities.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

References throughout this specification to one implementation, an implementation, an embodiment, and/or the like mean that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. However, these and other issues have a potential to vary in a particular context of usage. In other words, throughout the disclosure, particular context of description and/or usage provides helpful guidance regarding reasonable inferences to be drawn; however, likewise, "in this context" in general without further qualification refers to the context of the present disclosure.

The features and advantages of the disclosed method and apparatus will become more apparent to those skilled in the art after considering the following detailed description in connection with the accompanying drawing.

System and techniques herein provide for route selection techniques.

Figure 1:
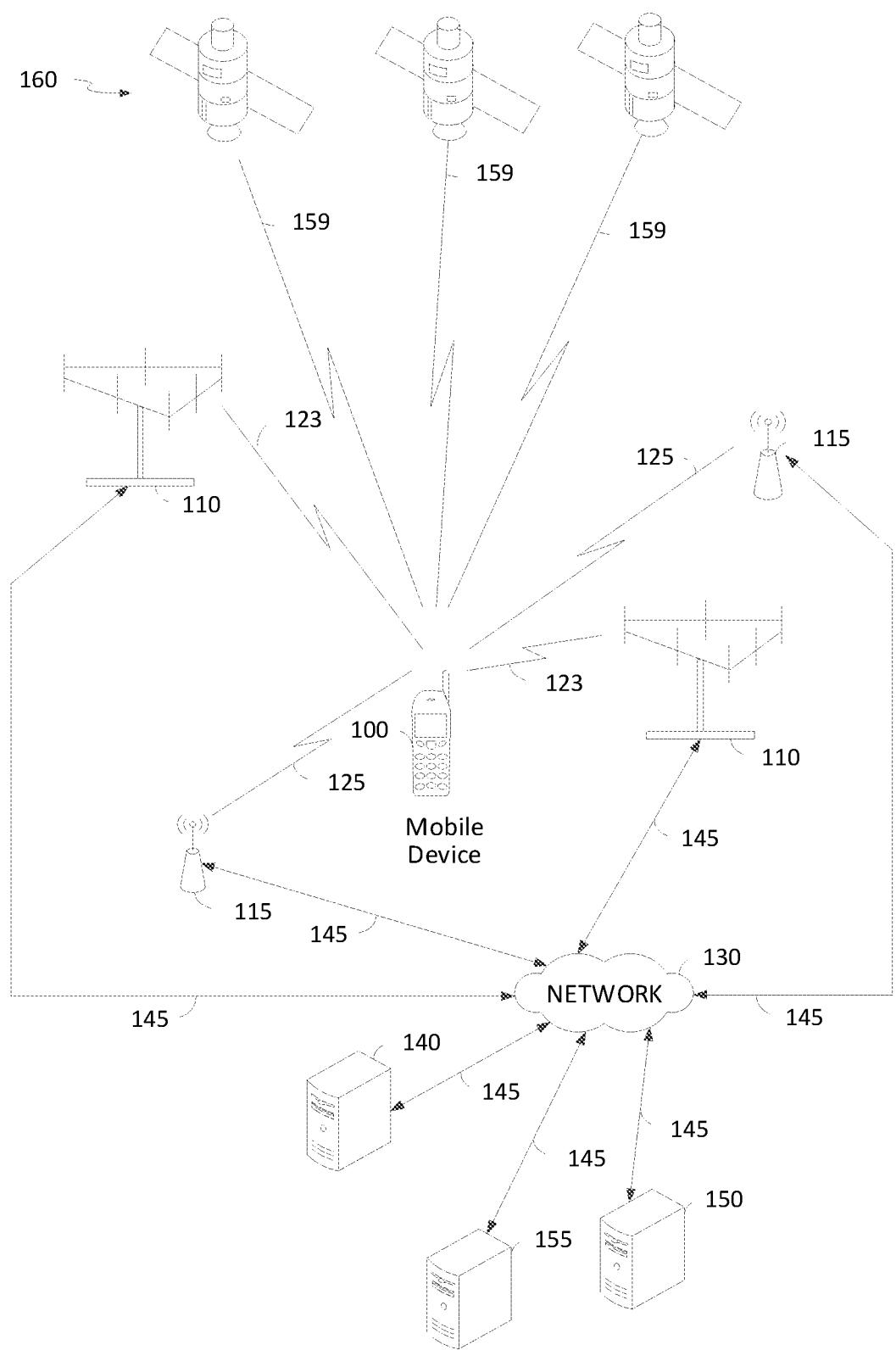
FIG. 1 shows an example of a communication environment in which various aspects of the disclosure may be implemented.

As shown in FIG. 1 in a particular implementation, mobile device 100, which may also be referred to as a UE (or user equipment), may transmit radio signals to, and receive radio signals from, a wireless communication network. In one example, mobile device 100 may communicate with a cellular communication network by transmitting wireless signals to, or receiving wireless signals from a cellular transceiver 110 which may comprise a wireless base transceiver subsystem (BTS), a Node B or an evolved NodeB (eNodeB) over wireless communication link 123. Similarly, mobile device 100 may transmit wireless signals to, or receive wireless signals from local transceiver 115 over wireless communication link 125. A local transceiver 115 may comprise an access point (AP), femtocell, Home Base Station, small cell base station, Home Node B (HNB) or Home eNodeB (HeNB) and may provide access to a wireless local area network (WLAN, e.g., IEEE 802.11 network), a wireless personal area network (WPAN, e.g., Bluetooth® network) or a cellular network (e.g. an LTE network or other wireless wide area network such as those discussed in the next paragraph). Of course, these are merely examples of networks that may communicate with a mobile device over a wireless link, and claimed subject matter is not limited in this respect.

Examples of network technologies that may support wireless communication link 123 are Global System for Mobile Communications (GSM), Code Division Multiple Access (CDMA), Wideband CDMA (WCDMA), Long Term Evolution LTE), High Rate Packet Data (HRPD). GSM, WCDMA and LTE are technologies defined by 3GPP. CDMA and HRPD are technologies defined by the 3rd Generation Partnership Project 2 (3GPP2). WCDMA is also part of the Universal Mobile Telecommunications System (UMTS) and may be supported by an HNB. Cellular transceivers 110 may comprise deployments of equipment providing subscriber access to a wireless telecommunication network for a service (e.g., under a service contract). Here, a cellular transceiver 110 may perform functions of a cellular base station in servicing subscriber devices within a cell determined based, at least in part, on a range at which the cellular transceiver 110 is capable of providing access service. Examples of radio technologies that may support wireless communication link 125 are IEEE 802.11, Bluetooth® (BT) and LTE.

In a particular implementation, cellular transceiver 110 and local transceiver 115 may communicate with servers 140, 150 and/or 155 over a network 130 through links 145. Here, network 130 may comprise any combination of wired or wireless links and may include cellular transceiver 110 and/or local transceiver 115 and/or servers 140, 150 and 155. In a particular implementation, network 130 may comprise Internet Protocol (IP) or other infrastructure capable of facilitating communication between mobile device I 00 and servers 140, 150 or 155 through local transceiver 115 or cellular transceiver 110. Network 130 may also facilitate communication between mobile device 100, servers 140, 150 and/or 155 and a public safety answering point (PSAP), for example through communications link 145). In an implementation, network 130 may comprise cellular communication network infrastructure such as, for example, a base station controller or packet based or circuit based switching center (not shown) to facilitate mobile cellular communication with mobile device 100. In a particular implementation, network 130 may comprise local area network (LAN) elements such as WLAN APs, routers and bridges and may in that case include or have links to gateway elements that provide access to wide area networks such as the Internet. In other implementations, network 130 may comprise a LAN and may or may not have access to a wide area network but may not provide any such access (if supported) to mobile device 100. In some implementations network 130 may comprise multiple networks (e.g., one or more wireless networks and/or the Internet). In one implementation, network 130 may include one or more serving gateways or Packet Data Network gateways. In addition, one or more of servers 140, 150 and 155 may be an E-SMLC, a Secure User Plane Location (SUPL) Location Platform (SLP), a SUPL Location Center (SLC), a SUPL Positioning Center (SPC), a Position Determining Entity (PDE) and/or a gateway mobile location center (GMLC), each of which may connect to one or more location retrieval functions (LRFs) and/or mobility management entities (MMES) in network 130.

In particular implementations, and as discussed below, mobile device 100 may have circuitry and processing resources capable of obtaining location related measurements (e.g. for signals received from GPS or other Satellite Positioning System (SPS) satellites 160, cellular transceiver 110 or local transceiver 115 and possibly computing a position fix or estimated location of mobile device 100 based on these location related measurements. In some implementations, location related measurements obtained by mobile device 100 may be transferred to a location server such as an enhanced serving mobile location center (E-SMLC) or SUPL location platform (SLP) (e.g. which may be one of servers 140, 150 and 155) after which the location server may estimate or determine a location for mobile device 100 based on the measurements. In the presently illustrated example, location related measurements obtained by mobile device 100 may include measurements of signals (159) received from satellites belonging to an SPS or Global Navigation Satellite System (GNSS) such as GPS, GLONASS, Galileo or Beidou and/or may include measurements of signals (such as 123 and/or 125) received from terrestrial transmitters fixed at known locations (e.g., such as cellular transceiver 110). Mobile device I 00 or a separate location server may then obtain a location estimate for mobile device I 00 based on these location related measurements using any one of several position methods such as, for example, GNSS, Assisted GNSS (A-GNSS), Advanced Forward Link Trilateration (AFLT), Observed Time Difference Of Arrival (OTDOA) or Enhanced Cell ID (E-CID) or combinations thereof. In some of these techniques (e.g. AGNSS, AFLT and OTDOA), pseudoranges or timing differences may be measured at mobile device 100 relative to three or more terrestrial transmitters fixed at known locations or relative to four or more satellites with accurately known orbital data, or combinations thereof, based at least in part, on pilots, positioning reference signals (PRS) or other positioning related signals transmitted by the transmitters or satellites and received at mobile device 100. Here, servers 140, 150 or 155 may be capable of providing positioning assistance data to mobile device 100 including, for example, information regarding signals to be measured (e.g., signal timing), locations and identities of terrestrial transmitters and/or signal, timing and orbital information for GNSS satellites to facilitate positioning techniques such as A-GNSS, AFLT, OTDOA and E-CID. For example, servers 140, 150 or 155 may comprise an almanac which indicates locations and identities of cellular transceivers and/or local transceivers in a particular region or regions such as a particular venue, and may provide information descriptive of signals transmitted by a cellular base station or AP such as transmission power and signal timing. In the case of E-CID, a mobile device 100 may obtain measurements of signal strengths for signals received from cellular transceiver 110 and/or local transceiver 115 and/or may obtain a round trip signal propagation time (RTT) between mobile device 100 and a cellular transceiver 110 or local transceiver 115. A mobile device 100 may use these measurements together with assistance data (e.g. terrestrial almanac data or GNSS satellite data such as GNSS Almanac and/or GNSS Ephemeris information) received from a server 140, 150 or 155 to determine a location for mobile device 100 or may transfer the measurements to a server 140, 150 or 155 to perform the same determination.

A mobile device (e.g. mobile device 100 in FIG. 1) may be referred to as a device, a wireless device, a mobile terminal, a terminal, a mobile station (MS), a user equipment (UE), a SUPL Enabled Terminal (SET) or by some other name and may correspond to a cellphone, smartphone, laptop, tablet, PDA, tracking device or some other portable or moveable device. Typically, though not necessarily, a mobile device may support wireless communication such as using GSM, WCDMA, LTE, CDMA, HRPD, Wi-Fi, BT, WiMax, etc. A mobile device may also support wireless communication using a wireless LAN (WLAN), DSL or packet cable for example. A mobile device may comprise a single entity or may comprise multiple entities such as in a personal area network where a user may employ audio, video and/or data I/O devices and/or body sensors and a separate wireline or wireless modem. An estimate of a location of a mobile device (e.g., mobile device 100) may be referred to as a location, location estimate, location fix, fix, position, position estimate or position fix, and may be geographic, thus providing location coordinates for the mobile device (e.g., latitude and longitude) which may or may not include an altitude component (e.g., height above sea level, height above or depth below ground level, floor level or basement level). Alternatively, a location of a mobile device may be expressed as a civic location (e.g., as a postal address or the designation of some point or small area in a building such as a particular room or floor). A location of a mobile device may also be expressed as an area or volume (defined either geographically or in civic form) within which the mobile device is expected to be located with some probability or confidence level (e.g., 67% or 95%). A location of a mobile device may further be a relative location comprising, for example, a distance and direction or relative X, Y (and Z) coordinates defined relative to some origin at a known location which may be defined geographically or in civic terms or by reference to a point, area or volume indicated on a map, floor plan or building plan. In the description contained herein, the use of the term location may comprise any of these variants unless indicated otherwise.

Figure 2:
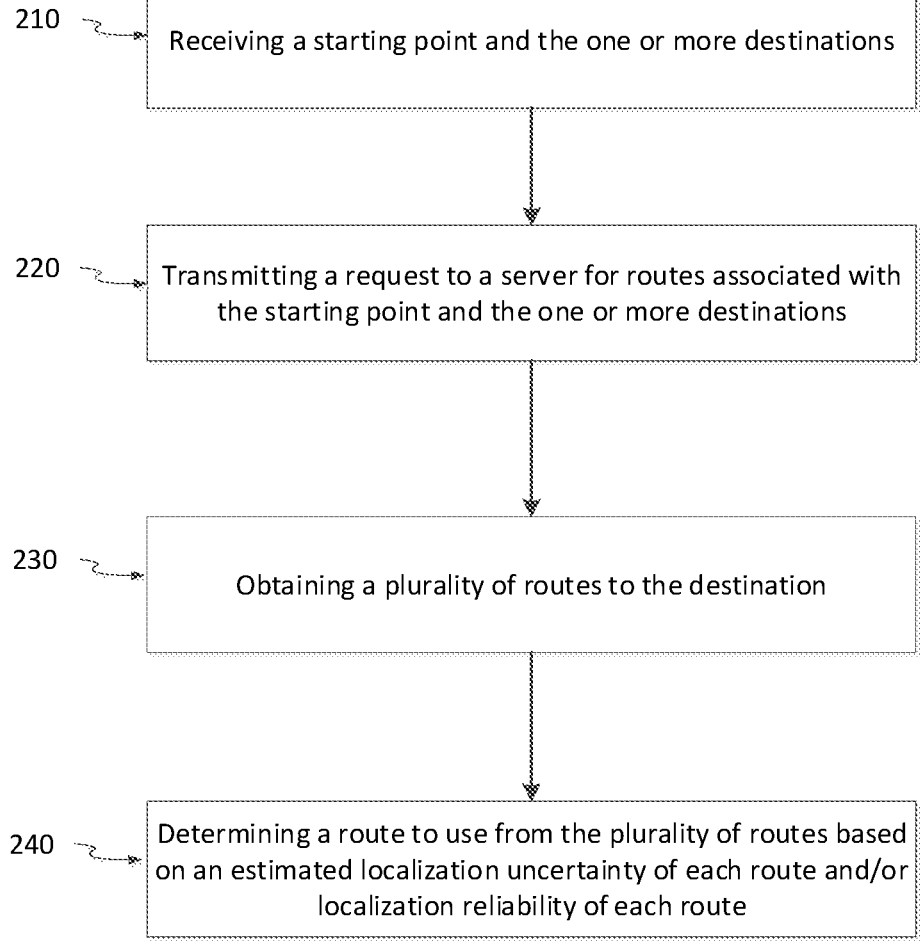
FIG. 2 shows an example process diagram illustrating a method of route selection to a destination.

FIG. 2 is a process diagram 200 illustrating an example method of route selection for a mobile device 100.

At block 210, the mobile device 100 and/or the server 140 may receive a starting point and the one or more destinations. The mobile device 100 may receive the starting point and the one or more destinations via user input (e.g. voice command, user interface). In another implementation, the mobile device 100 and/or the server 140 may receive this information from a secondary device, such a user's mobile phone, where the user may interact directly with the secondary device and the secondary device may transmit this information either directly or through one or more intermediaries to the mobile device 100 and/or the server 140.

At block 220, the mobile device 100 and/or the server 140 may transmit a request to a server for routes associated with the starting point and the one or more destinations. In one implementation, the mobile device 100 may transmit this request to the server 140 or a different server. In another implementation, the server 140 may transmit this request a second server (e.g. routing server).

At block 230, the mobile device 100 and/or the server 140 may receive, from a server, a plurality of routes to the one or more destinations. The server 140 may handle autonomous vehicles routing so it may send a request to a generic routing server to obtain all possible routes to the one or more destinations, but the server 140 may ultimately be responsible for determine or selecting which of these routes are appropriate for the autonomous vehicle. In another implementation, the mobile device 100 may obtain the plurality of routes from a routing server, so the mobile device 100 can select the route that is appropriate for it to use.

In one implementation, the device 100 and/or the server 140 may utilize the positioning capabilities of the device 100 (or the positioning capabilities of a second device that has device 100 embedded within it) to narrow the routes to the destination. For example, if the device 100 can only perform visual odometry then a route with little to no visual features will be removed, filtered or have its weight/priority reduced.

At block 240, the mobile device 100 and/or the server 140 may select a route to use from the plurality of routes based on an estimated localization uncertainty of each route and/or localization reliability of each route. The estimated localization uncertainty is an estimate of the positioning precision of a device determining a position location along the route and/or segment, such as horizontal dilution of precision (HDOP), vertical dilution of precision (VDOP), position dilution of precision (PDOP), geometric dilution of precision (GDOP), etc. or any combination thereof. The localization reliability of a route and/or segment is one or more parameters that indicate the likelihood of determining a position location along the route and/or segment and/or it may also indicate the likelihood of determining a position location with an estimated localization uncertainty.

In an example, if there are two different determined routes but one route has a localization uncertainty of fifty meters and time to destination is one hour, but the second route has a localization uncertainty of one meter and time to destination is one hour and ten minutes then the mobile device 100 and/or the server 140 may select the second route because the localization uncertainty is lower even though the time to destination is longer.

The localization uncertainty may provide the overall localization uncertainty that is determined via crowdsourcing or war driving, but it may also provide additional information to make the uncertainty more applicable to the device 100. The localization uncertainty may include the positioning technologies used to achieve the uncertainty, it may include the uncertainty for determining a position using a specific positioning technology, etc. It may also include the device type, such as make, model, software version, etc.

While this information may be obtained or provided to the device 100, it is important to note this may also be used to filter or narrow the relevant data that is obtained or provided to the device 100. For example, if the device 100 is sedan of a first model by a first manufacturer then localization uncertainty for the routes may be filtered so only localization uncertainty that was obtained via the first manufacturer and/or first model may be used by the device 100. This may be further narrowed by the model year, software version, etc. In another example, instead of filtering based on the manufacturer and/or model the device 100 may obtain a data set specific to the manufacturer and/or model and a second data set that generally is available for most or all devices (or it could be limited based on device type (e.g. sedan)).

The localization reliability parameters may be used for determining which route to take, because even if the localization uncertainty is low on one route there is no guarantee that a device can reliably determine a good position with low uncertainty along the route. As a result, localization reliability may be a factor in route selection. For example, one route may have one or more high localization reliability parameters but longer distance and a second route may have a shorter distance but is less reliable, so the mobile device 100 and/or the server 140 may identify the first route as the route to use because of the higher reliability even though it has a longer distance.

The localization reliability parameters may be one or more composite scores and/or it may be one or more parameters that indicate reliability. In one implementation, the localization reliability parameters may comprise number of features, number of obscured features, number of feature mismatch, average features typically seen and/or used, number of outliers, number of false positives, number of false positives for each technology type, minimum number of features, maximum number of features, number of obscured items, average number of obscured items, maximum number of obscured items, number of mismatches between wheel odometry and visual odometry, technologies that on average are used for a fix, reliability of each technology for determining a position fix, reliability of each technology, reliability of each fallback positioning technology or any combination thereof.

In one implementation, the localization reliability parameters may include one or more characteristics related to the location technology used along the route. As an example, if localization is performed based at least in part on feature detection (e.g. landmark based positioning) then localization reliability parameters may include the number of features along the route/segment, maximum number of features along the route/segment, minimum number of features along the route/segment, average number of features along the route/segment, etc.

The number of features along the route and/or segment may indicate whether or not a device, which uses feature detection for localization, has a sufficient number of features along the route to perform localization. For example, a device may need twenty feature points per one hundred feet, so if a segment of road only has five feature points it may indicate that the segment is not usable by a device that only performs localization by feature detection. The one or more thresholds may be device specific, model specific, device/model agnostic, etc. This may also include the maximum, minimum or any other statistic involving number of features along the route (e.g. average, median, standard deviation). The number of features may be the number of features seen and/or used. It may include separate values for number of features seen and a different value for number of features used.

The parameters may also include the number of obscured items along the route and/or segment and/or statistics related to the number of obscured items. For example, the road may contain radar or ultrasound based markers on the road but they may be obscured or may not be working properly to aid the vehicle. In another example, the obscured items may be features along the route that are obscured by another entity, such as a semi-truck blocking line of sight from the device to the feature. The parameters may include statistics related to the number of features that are obscured along the route (e.g. average, maximum, minimum, median, etc). For example, the parameters may indicate on average there are five features obscured along the route and/or segment. This may also be device and/or model specific. For example, if the device is a sedan then it may indicate on average a sedan only sees fifteen features along the route and/or segment but there are twenty known features along the route and/or segment so there are five obscured features for sedans. In another example, the device may be a particular make and/or model of a sedan, so it may provide statistics that are based on those collected from similar vehicles.

The parameters may include statistics related to false positives (e.g. feature mismatch). Also, it may also include specific statistics related to device, model, make, etc. or any combination thereof. If a device has traversed a route before but mismatched certain features, then the statistics may include that information and/or may be adjusted accordingly. For example, a device routinely mismatches ten features along a route that only contains twenty-five features, so during route planning rather than the device obtaining there are twenty-five features along the route and/or segment then it obtains or determines there are only fifteen features because of the ten mismatches and it may select a different route and/or segment or be provided with a different route and/or segment.

While the false positives may be technology agnostic, in some cases the false positives may be provided for each technology type. In some cases, ultrasound and/or radar may have false positives that may be inadvertently identified as a nearby vehicles or potential collisions. False positives may occur in various areas, such as by railroad tracks, etc. In those situations, being informed of false positions in those locations allows the device to handle those false positives a priori rather than handling them at run time. By specifying which technology is affected by false positives in certain areas, it may enable the device to not use that technology in the area or not rely on the technology as significantly it would have if the false positives in the area did not exist.

According to the aspect of the disclosure, information about mismatches between the wheel odometry and visual odometry along a route and/or segment may also be provided or obtained by the device. For example, if there are consistent mismatches between the wheel odometry and the visual odometry along a segment of the road then this may indicate the reliability of the visual odometry (e.g. feature detection, landmark based positioning) is not as reliable.

Reliability parameters may also include information related to position fixes. For example, the reliability parameters may include statistics related to outliers, reliability of each positioning technology, reliability of each fallback positioning technology, reliability of each positioning technology for position determination or any combination thereof.

The parameter(s) may include statistics related to outliers from a position determination. For example, after a position fix has been determined using one or more features, it may determine if any features are outliers from the position determination. This may be useful for indicating the reliability of each feature. Additionally, this may be used to generally indicate the number of outliers seen during travel along a route and/or a segment.

The parameter(s) may also indicate reliability of each positioning technology that was used along the route and/or segment; and/or it may indicate reliability of using various combinations of positioning technologies along the route and/or segment. For example, the parameter(s) may specify that the reliability is high when using GNSS and radar, but poor reliability when using feature detection (e.g. landmark based positioning). In those circumstances, a device may choose to not use feature detection during those particular segments and/or route or use them less frequently.

It may also indicate the reliability of each positioning technology for determining a positioning fix. This may indicate whether or not to use data from the positioning technology in performing a positioning fix. For example, GNSS and radar may have high reliability for positioning fixes, but feature detection may have low reliability for determining a position fix. In this case, the device may use feature detection for purposes other than positioning determination, such as lane detection, lane departure, directionality, etc.

The parameter(s) may also indicate which positioning technologies are also available along the route, the preferred positioning technologies, the fallback positioning technologies and parameters, such as uncertainty and reliability, for each of the positioning technologies or any combination thereof. For example, the parameter(s) may indicate localization uncertainty and localization reliability for visual positioning, which is the preferred positioning technology to use along the route, but it may also indicate fallback positioning technologies, such as SPS and wide area terrestrial positioning, that may be used along the route along with uncertainty and reliability of those fallback positioning technologies.

A route may be identified or selected from the two or more routes to the destination based on a comparison of the localization uncertainty and/or the localization reliability of each of the routes. For example, if a first route has low localization uncertainty but low reliability but the second route has a slightly worse localization uncertainty but high reliability then the second route may be selected.

Additionally, the device's capabilities may be used to identify a route from the plurality of the route. For example, if the device is only capable of SPS but the route's preferred positioning technology is visual positioning then the route may be excluded; however, if the route has a fallback positioning technology associated with SPS that provides a positioning uncertainty and/or positioning reliability that meets or exceeds one or more thresholds then the route may be still be used by the device for use and the route may be selected or identified from the plurality of potential routes.

In one implementation, the route selection described in FIG. 2 may be performed by the device that will traverse the selected route or co-located with a device that will traverse the selected route, may be a remote device that is remote from the origin, destination or the route or it may be a combination of the two devices. In any situation, the device that may traverse the route may have multiple route options available and have them available as fallback options in case there is a problem along the selected route. For example, if the traffic is worse than expected then the device may use a fallback route or provide a prompt to the user to select a fallback route or prioritize which criteria are most important in the moment (i.e. minimize time to destination, safety, etc). Similarly, this may be done if the reliability and/or uncertainty parameters are different from expected. For example, if device determined the uncertainty on the route drops below an expected value or a threshold value then it may select a fallback route, prompt the user to select a different route or even request that the user take over control of the device or be in a position to potentially take over control of the device.

According to an aspect of the disclosure, the routes may be segmented and the localization uncertainty and localization reliability of each segment may be compared to determine a route for the device 100.

Figure 3:
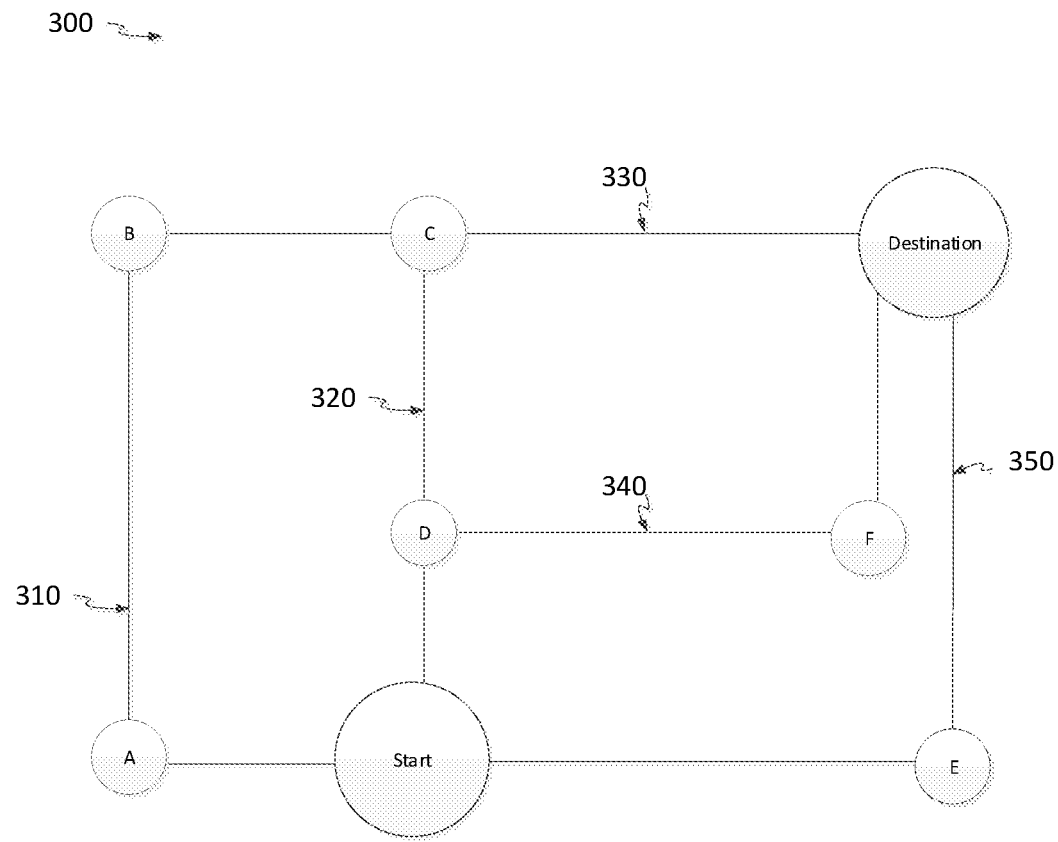
FIG. 3 is an example of multiple routes and route segmentation that may be used for route selection.

As an example, FIG. 3 shows how various routes 300 may be segmented. Route 310 may be from start to Node A to Node B to Node C but then it has multiple paths to the destination either via Node D or directly to the destination. In terms of comparison, if Route 310 is the only route available then the localization uncertainty, localization reliability and/or additional parameters may be used to determine which path to select whether it is from Node C to destination or Node C to Node D to Node F to destination. It could be that Node C to destination has poor localization uncertainty and/or poor localization reliability compared to the Node D path, so even though it is the shortest path and/or may have the shortest time to destination it may also be the least safe path for an ADAS or self driving vehicle to take.

In another example, the routes may be compared in totality. In FIG. 3, multiple routes/segments 310, 320, 330, 340 and 350 are shown, and some routes such as 310 actually lead away from the destination are first. In this example, there are five routes that can go from the start to the destination, the first route uses route 310 and goes through route 330 to the destination (start to node A, to node B to node C to destination), the second route uses route 310 and goes through 320 and 340 to the destination (start to node A to node B to node C to node D to node F to destination), the third route goes from the start through route 320 and 330 to the destination (start to node D to node C to destination), the fourth route goes through route 340 to the destination and the fifth route goes through route 350 to the destination. Each route has one or more parameter values for localization uncertainty, localization reliability and/or additional parameters and each route would be compared against each other to identify a route to use. One way of doing this is the route parameters values may be set to the minimum value of each of their segments, so for the first route if Node B to Node C had the lowest values for localization uncertainty and localization reliability then the first route would be set to the parameters for Node B to Node C. In one implementation, the route may average the scores across each of the segments or perform any other statistical method for comparing the routes.

Each of the segments between nodes can be checked against one or more thresholds to determine whether or not to potentially use a route containing that segment. For example, if route/segment 310 that include node A to node B is high or poor localization uncertainty that does not meet one or more thresholds than then routes containing that segment may be filtered or deweighted and the rest of the routes may be evaluated.

The segments may be compared against other segments individually or in various combinations. For example, Node A to Node B may be compared against Node E to Destination to determine how the parameters for those segments compare. In another example, start to Node A to Node B to Node C may be combined and the combination may be compared against Node E to Destination. In that example, it may be beneficial to do the combination comparison because the device would have to move away from the destination and back towards the destination when it reached Node C, so this may allow for a more thorough evaluation of how to get make similar progress to the destination and account of the extra segments the device would have to traverse.

The route and/or segment may be identified and/or selected using additional parameters, such as time of day, historical data, traffic, time to destination, vehicles registered to use a particular route, number of vehicles expected or estimated to be in the vicinity, capabilities of vehicles registered for a route or historically use the route and/or segment, or any combination thereof.

In some situations where multiple routes are similar, these additional parameters may be used to identify a route to use. For example, if the localization uncertainty and localization reliability are similar, it may use data indicating the number of vehicles that are expected to be near or on the route at a particular time of day and if multiple vehicles are requesting a similar route then the device 100 and/or the server 140 can coordinate the routes that are identified to lessen the impact of all the devices 100 that was to get to a similar destination or use a similar route. Two devices may request a similar destination and/or route, so one device 100 may identify a first route and then a second device 100 may be provided with a second route so that the devices lessen the impact on each other. As a result, this may also be useful to coordinate traffic without needing to be in proximity to the route (e.g. a remote server or a remote device).

FIG. 3 is merely an illustration, and the nodes indicated in FIG. 3 may occur at any point and does not have to correspond to changes in direction, etc. Additionally, a segment of a route does not have to correspond to a change in direction, it may be a small section along a straight route, etc. Also, while FIG. 3 shows a two-dimensional route, this is also applicable for three dimensional routes, such as flight paths, etc.

Figure 4:
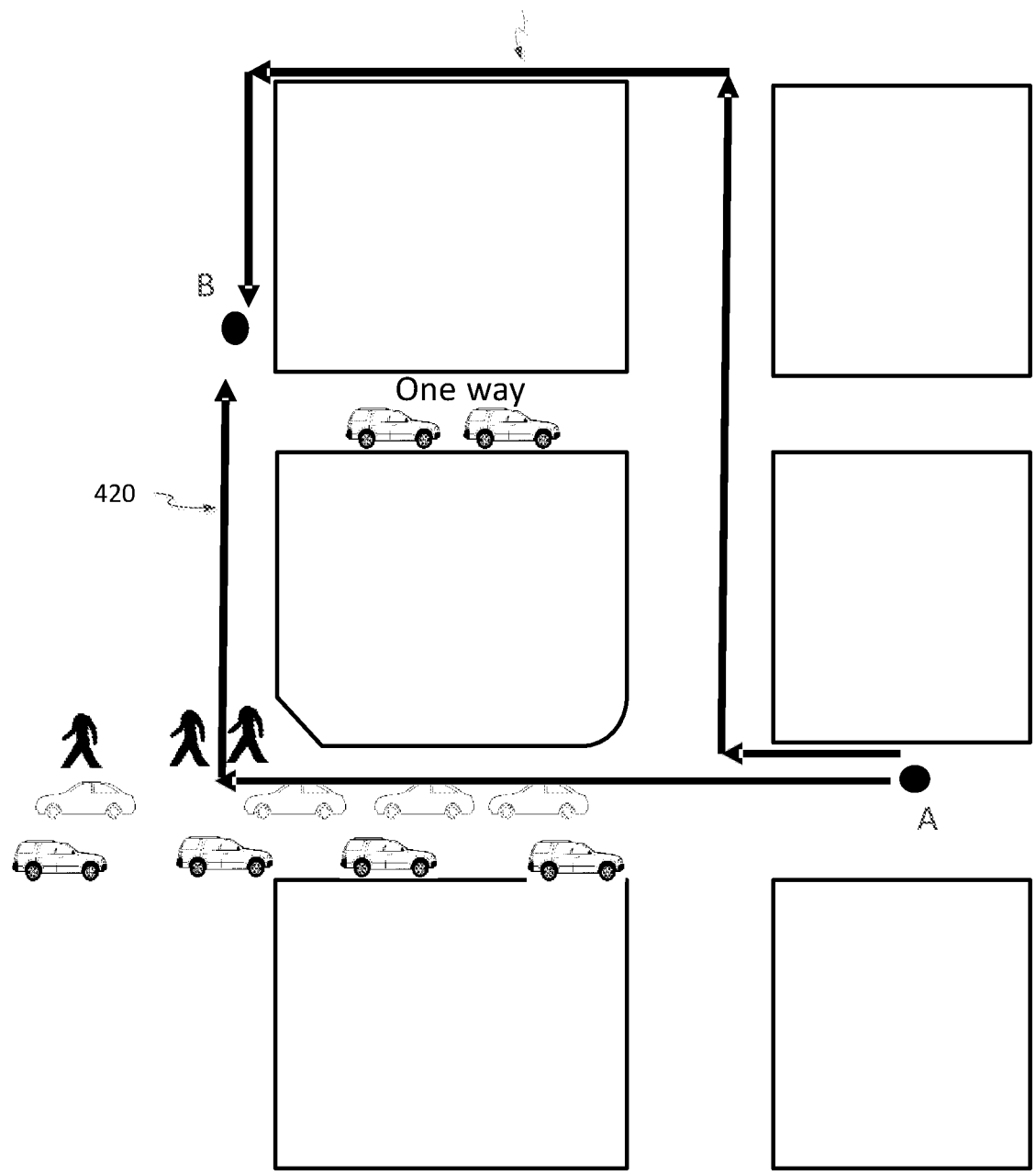
FIG. 4 is an example of route selection in which various aspects of the disclosure may be implemented.

FIG. 4 is an example of route selection in which various aspects of the disclosure may be implemented. The two-dimensional FIG. 400 shows various routes that a vehicle can take. Route 410 is shorter, but it requires the vehicle to go through a busy intersection that historically and/or currently has many pedestrians, which may require the vehicle to use its camera(s) and/or radar to avoid the pedestrians. Route 420 is longer however the vehicle may be able to navigate or provide driver assistance using technologies other than its camera(s) and/or radar. If the vehicle is not equipped with camera(s) and/or radar(s), has camera(s) and/or radar(s) with low reliability (i.e. they have been experiencing issues) or they aren't able to handle scenarios where low latency is needed (i.e. a pedestrian darting in front of a vehicle) then it may select route 420. If that isn't the case, then it may select route 410.

Figure 5:
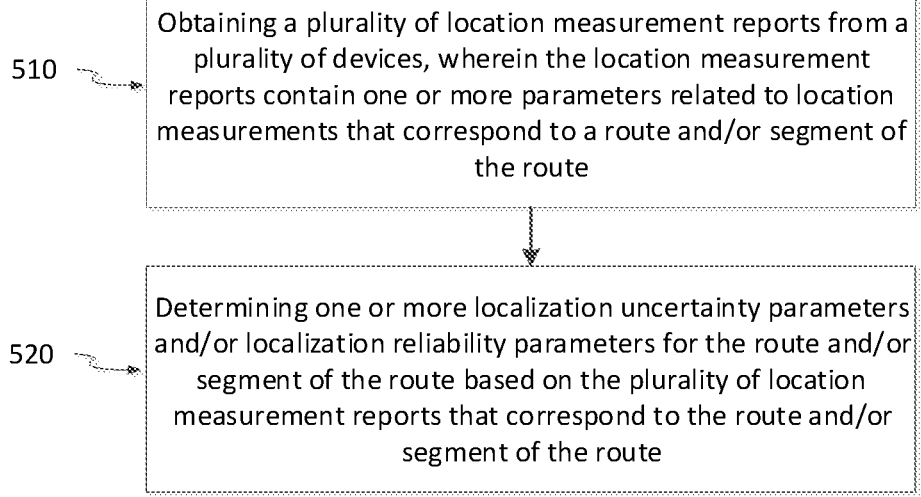
FIG. 5 is an example process diagram illustrating a method of crowdsourcing metric information related to location measurements.

FIG. 5 is a process diagram 500 illustrating an example method of crowdsourcing metric information related to location measurements.

At block 510, the server 140 obtains a plurality of location measurement reports from a plurality of devices, wherein the location measurement reports contain one or more parameters related to location measurements that correspond to a route and/or segment of the route. The plurality of devices may be of the same device type, different device types or any combination thereof.

The parameters of the location measurement may comprise any of the parameters described throughout the specification, such as location reliability, location uncertainty, etc. For example, the parameters may indicate the location technology that was used to determine the location of the device while on the road, along with any mismatches or false positives that were detected from the location measurements.

In one implementation, the raw location measurements may be provided to the server 140 along with the final determined position location. This allows the devices to provide data they have already determined or measured without having to determine additional metrics or identify if there are any mismatches or false positives. The raw location measurements may be feature points that are detected by the device, SPS satellite measurements, pseudorange measurements of nearby base stations, etc. The raw location measurement is any measurement that may potentially be used to determine to the device's position or orientation.

According to an aspect of the disclosure, the location measurement reports may also include vehicle information (e.g. vehicle type, vehicle make, vehicle model, location of positioning sensors on the vehicle, etc.). The parameters provided in FIG. 2 are also applicable for crowdsourcing in this method as well.

At block 520, the server 140 determines one or more localization uncertainty parameters and localization reliability parameters for the route and/or segment of the route based on the plurality of location measurement reports that correspond to the route and/or segment. For example, the server 140 may identify all of the location measurements that correspond to a location along the route and/or segment and average the uncertainty of all the location measurements to determine the localization uncertainty of the route and/or segment.

The server 140 may perform various operations to determine the localization uncertainty of the route and/or segment, such as average, median, standard deviation, etc., may filter and/or group measurements based on other parameters, such as device type, make, model, etc. or any combination thereof. For example, the server 140 may group the location measurement reports based on the device type, such as a quadcopter drone, and then determine the average uncertainty seem by all makes of quadcopter drones along the same route and/or segment. It may also use additional parameters to all or further group or filter the results, such as quadcopter low altitude cargo carrying drone vs quadcopter high altitude surveillance drone.

According to the aspect of the disclosure, the server 140 may also use raw location measurements to detect various potential issues along the route and/or segment. For example, if raw location measurement data indicates feature points that do not correspond to the final determination location of the device then the server 140 may identify there are potential mismatches and/or false positives for the visual positioning along the route. It may also use this information to adjust the localization reliability parameters according to indicate visual positioning reliability may be lower or may indicate that visual positioning may need use a different positioning technology to feature points or those previously identified mismatched feature points.

The server 140 may also segment roads and/or routes based on the crowdsourced location information. For example, if the expected location information at a particular location is different from what is received then the server 140 may segment the road to indicate different data associated with each portion of the route.

In an implementation, the server 140 may identify the minimum localization uncertainty and/or localization reliability parameters for the road, route and/or segment. According to an aspect of the disclosure, the server 140 may identify the range of localization uncertainty and/or localization reliability parameters for a particular road, route and/or segment and associate the range with the road, route and/or segment.

The server 140 may determine, either dynamically or a-priori, estimated localization uncertainty and/or localization reliability parameters for various vehicles that may travel along the road and/or segment. This may be done for all vehicles, by vehicle type, by vehicle make and/or model, etc. The server 140 may also determine estimated location information based on the driving mode (e.g. ADAS, self-driving, etc). It may also determine the localization uncertainty and/or localization reliability for each positioning technology, and it may also provide the preferred positioning type for each route and/or segment (e.g. highest rated and/or most reliable).

Figure 6:
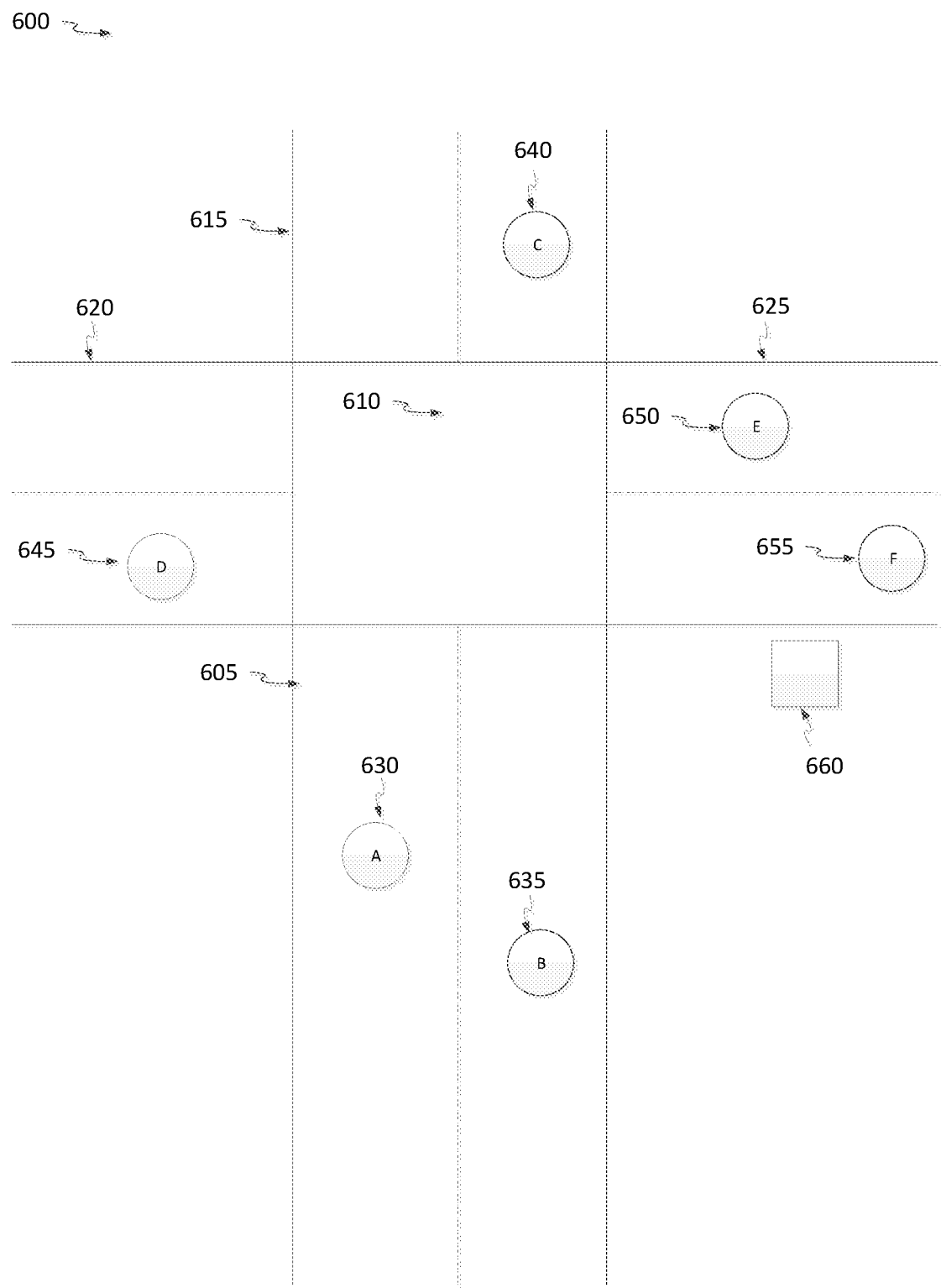
FIG. 6 is an example of crowdsourcing metrics information.

FIG. 6 is an example of crowdsourcing metrics information from a plurality of vehicles. The two-dimensional overview 600 of roads 605, 615, 620, 625 and intersection 610 shows various vehicles 630, 635, 640, 645, 650, 655 on those roads. Each of those vehicles 630, 635, 640, 645, 650, 655 may have a capability to communicate with one or more servers, including server 140.

As an example, vehicle 630 and 635 may provide location information that is associated with road 605 to server 140. The location information may also include vehicle information (e.g. vehicle model, make, etc.). According to an aspect of the disclosure, if vehicle 630 and 635 are of the same make and model, only one of the vehicles may need to report location information to the server 140. In this scenario, the server 140 may indicate which vehicle should report and/or the vehicles 630 and 635 may coordinate amongst themselves to determine which will report to the server 140. Even though, the server 140 may only need data from one of the vehicles that are of the same make and/or model, it may still enable a plurality of vehicles with the same make and/or model to report to the server 140.

According to an aspect of the disclosure, even though road 605 and road 615 are the same street, this shows how the roads may be segmented for crowdsourcing. Segmentation also doesn't need to be pre-defined; instead, the server 140 may identify a disparity in the location information at different locations along a route. For example, vehicle 650 and 655 may be reporting location information at their respective locations along road 625 that may be different (e.g. location uncertainty may be different), so the server 140 may segment the crowdsourced data associated with road 625 into two different segments one, one segment at the beginning of road 625 and ending between vehicle 650 and 655, and a second segment starting at the end of the first segment and end at the end of road 625.

In another example, a vehicle may detect an obstruction that may affect positioning metrics, such as obstruction 660. The obstruction may be a physical obstruction (e.g. tree coverage, traffic signal, buildings, etc.) or may be interference (e.g. GNSS interference, radar interference, etc). Physical obstructions may affect certain types of positioning (e.g. visual positioning, radar, ultrasonic); and interference may affect other types of positioning (e.g. wireless terrestrial positioning, GNSS positioning). It is important to note the physical obstructions and interference may also affect the same positioning techniques as well.

Figure 7:
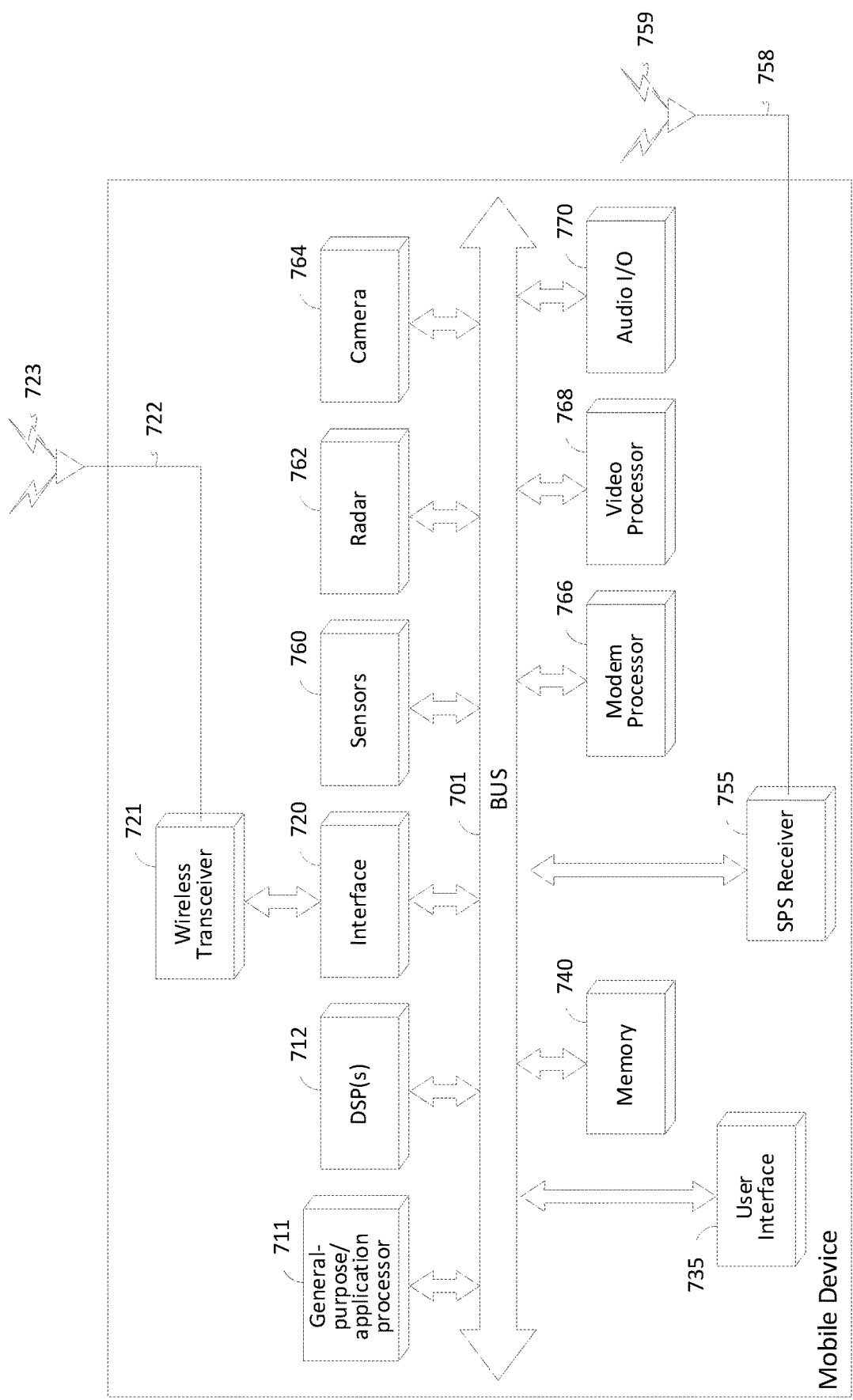
FIG. 7 is an example mobile device and the components within the mobile device in which aspects of the disclosure may be implemented.

FIG. 7 is a schematic diagram of a mobile device 700 according to an implementation. Mobile device 100 shown in FIG. 1 may comprise one or more features of mobile device 700 shown in FIG. 7. In certain implementations, mobile device 700 may comprise a wireless transceiver 721 which is capable of transmitting and receiving wireless signals 723 via wireless antenna 722 over a wireless communication network. Wireless transceiver 721 may be connected to bus 701 by a wireless transceiver bus interface 720. Wireless transceiver bus interface 720 may, in some implementations be at least partially integrated with wireless transceiver 721. Some implementations may include multiple wireless transceivers 721 and wireless antennas 722 to enable transmitting and/or receiving signals according to corresponding multiple wireless communication standards such as, for example, versions of IEEE Standard 802.11, CDMA, WCDMA, LTE, UMTS, GSM, AMPS, Zigbee®, Bluetooth® and a 5G or NR radio interface defined by 3GPP, just to name a few examples. In a particular implementation, wireless transceiver 721 may transmit signals on an uplink channel and receive signals on a downlink channel as discussed above. The wireless transceiver 721 may provide the capabilities of the device 700, destination, starting location or current location of the device 700 to the server 140.

Mobile device 700 may also comprise SPS receiver 755 capable of receiving and acquiring SPS signals 759 via SPS antenna 758 (which may be integrated with antenna 722 in some implementations). SPS receiver 755 may also process, in whole or in part, acquired SPS signals 759 for estimating a location of mobile device 700. In some implementations, general-purpose processor(s) 711, memory 740, digital signal processor(s) (DSP(s)) 712 and/or specialized processors (not shown) may also be utilized to process acquired SPS signals, in whole or in part, and/or calculate an estimated location of mobile device 700, in conjunction with SPS receiver 755. Storage of SPS or other signals (e.g., signals acquired from wireless transceiver 721) or storage of measurements of these signals for use in performing positioning operations may be performed in memory 740 or registers (not shown). General-purpose processor(s) 711, memory 740, DSP(s) 712 and/or specialized processors may provide or support a location engine for use in processing measurements to estimate a location of mobile device 700. In a particular implementation, all or portions of actions or operations set forth for process 700 may be executed by general-purpose processor(s) 711 or DSP(s) 712 based on machine-readable instructions stored in memory 740.

Also shown in FIG. 7, digital signal processor(s) (DSP(s)) 712 and general-purpose processor(s) 711 may be connected to memory 740 through bus 701. A particular bus interface (not shown) may be integrated with the DSP(s) 712, general-purpose processor(s) 711 and memory 740. In various implementations, functions may be performed in response to execution of one or more machine-readable instructions stored in memory 740 such as on a computer-readable storage medium, such as RAM, ROM, FLASH, or disc drive, just to name a few examples. The one or more instructions may be executable by general-purpose processor(s) 711, specialized processors, or DSP(s) 712. Memory 740 may comprise a non-transitory processor-readable memory and/or a computer-readable memory that stores software code (programming code, instructions, etc.) that are executable by processor(s) 711 and/or DSP(s) 712. The processor(s) 711 and/or the DSP(s) 712 may be used to perform various operations as described throughout the specification. For example, the processor(s) 711, the DSP(s) 712 and/or wireless transceiver 721 in conjunction with memory 740 may be used to obtain a plurality of routes to the destination, similar to block 210. The processor(s) 711 and/or the DSP(s) 712 in conjunction with memory 740 determine a route to use from the plurality of determined routes based on an estimated localization uncertainty of each route and/or localization reliability of each route, similar to block 220.

Also shown in FIG. 7, a user interface 735 may comprise any one of several devices such as, for example, a speaker, microphone, display device, vibration device, keyboard, touch screen, just to name a few examples. In a particular implementation, user interface 735 may enable a user to interact with one or more applications hosted on mobile device 700. For example, devices of user interface 735 may store analog or digital signals on memory 740 to be further processed by DSP(s) 712 or general-purpose processor 711 in response to action from a user. Similarly, applications hosted on mobile device 700 may store analog or digital signals on memory 740 to present an output signal to a user. In another implementation, mobile device 700 may optionally include a dedicated audio input/output (I/O) device 770 comprising, for example, a dedicated speaker, microphone, digital to analog circuitry, analog to digital circuitry, amplifiers and/or gain control. Audio I/O 770 may also include ultrasound or any audio based positioning that can be used to determine the position, orientation or context of the mobile device 700. It should be understood, however, that this is merely an example of how an audio I/O may be implemented in a mobile device, and that claimed subject matter is not limited in this respect.

Mobile device 700 may also comprise a dedicated camera device 764 for capturing still or moving imagery. Camera device 764 may comprise, for example an imaging sensor (e.g., charge coupled device or CMOS imager), lens, analog to digital circuitry, frame buffers, just to name a few examples. In one implementation, additional processing, conditioning, encoding or compression of signals representing captured images may be performed at general purpose/application processor 711 or DSP(s) 712. Alternatively, a dedicated video processor 768 may perform conditioning, encoding, compression or manipulation of signals representing captured images. Additionally, video processor 768 may decode/decompress stored image data for presentation on a display device (not shown) on mobile device 700.

Mobile device 700 may also comprise sensors 760 coupled to bus 701 which may include, for example, inertial sensors and environment sensors. Inertial sensors of sensors 760 may comprise, for example accelerometers (e.g., collectively responding to acceleration of mobile device 700 in three dimensions), one or more gyroscopes or one or more magnetometers (e.g., to support one or more compass applications). Environment sensors of mobile device 700 may comprise, for example, temperature sensors, barometric pressure sensors, ambient light sensors, camera imagers, microphones, just to name few examples. Sensors 760 may generate analog or digital signals that may be stored in memory 740 and processed by DSP(s) 712 or general-purpose application processor 711 in support of one or more applications such as, for example, applications directed to positioning or navigation operations. The sensors 760 may also include radar 762, which may be used to determine the distance between the device and another object. The sensors 760, SPS receiver 755, wireless transceiver 721, camera(s) 764, audio i/o 770, radar 762 or any combination thereof may be used determine one or more location measurements and/or a position location of the mobile device 700.

In a particular implementation, mobile device 700 may comprise a dedicated modem processor 766 capable of performing baseband processing of signals received and down converted at wireless transceiver 721 or SPS receiver 755. Similarly, modem processor 766 may perform baseband processing of signals to be upconverted for transmission by wireless transceiver 721. In alternative implementations, instead of having a dedicated modem processor, baseband processing may be performed by a general-purpose processor or DSP (e.g., general purpose/application processor 711 or DSP(s) 712). It should be understood, however, that these are merely examples of structures that may perform baseband processing, and that claimed subject matter is not limited in this respect.

Figure 8:
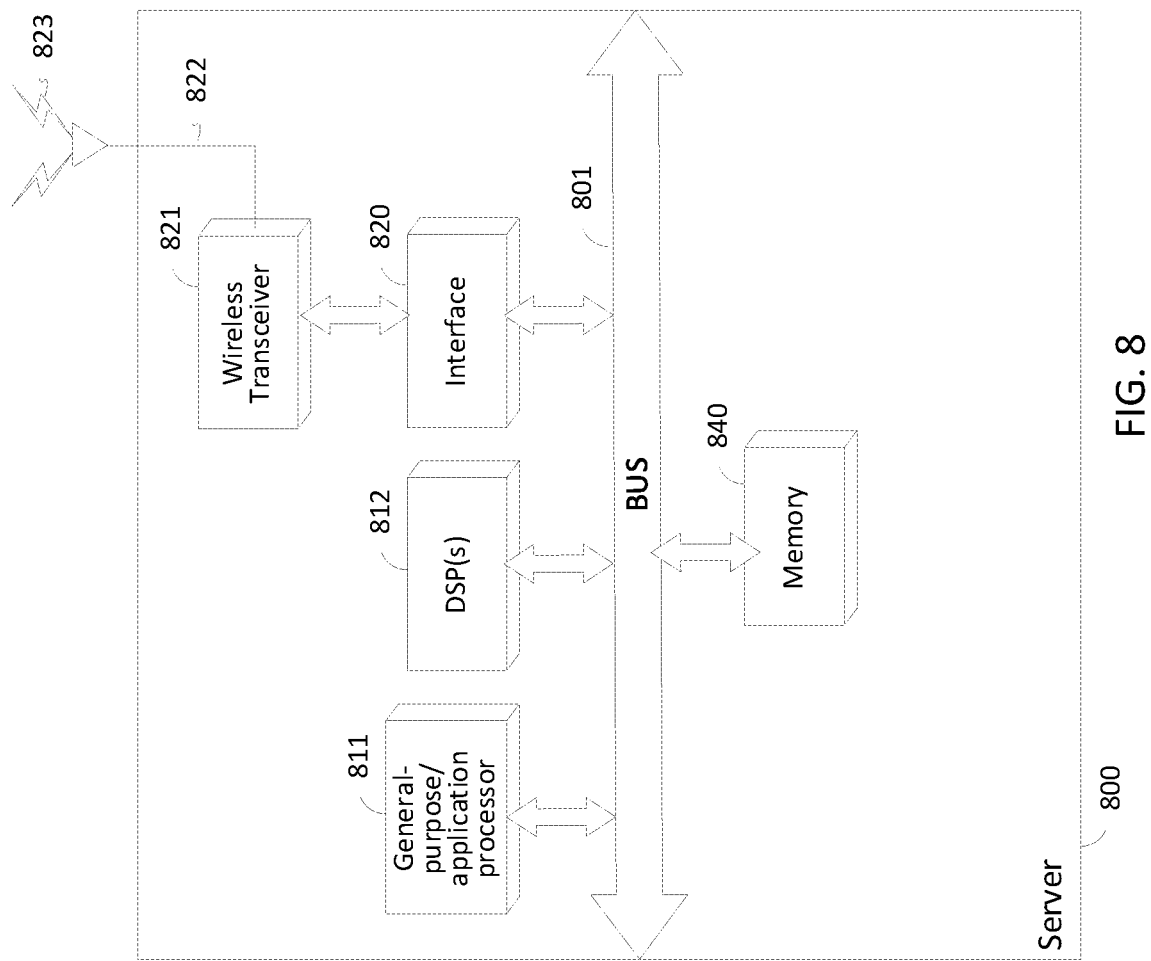
FIG. 8 is an example server and the components within the server in which aspects of the disclosure may be implemented.

FIG. 8 is a schematic diagram of a server 800 according to an implementation. Server 140 shown in FIG. 1 may comprise one or more features of server 800 shown in FIG. 8. In certain implementations, server 800 may comprise a wireless transceiver 821 which is capable of transmitting and receiving wireless signals 823 via wireless antenna 822 over a wireless communication network. Wireless transceiver 821 may be connected to bus 801 by a wireless transceiver bus interface 820. Wireless transceiver bus interface 820 may, in some implementations be at least partially integrated with wireless transceiver 821. Some implementations may include multiple wireless transceivers 821 and wireless antennas 822 to enable transmitting and/or receiving signals according to corresponding multiple wireless communication standards such as, for example, versions of IEEE Standard 802.11, CDMA, WCDMA, LTE, UMTS, GSM, AMPS, Zigbee®, Bluetooth® and a 5G or NR radio interface defined by 3GPP, just to name a few examples. In a particular implementation, wireless transceiver 821 may transmit signals on an uplink channel and receive signals on a downlink channel as discussed above.

The server 800 may include a wired interface (not shown in FIG. 8), such as ethernet, coaxial cable, etc. The server 800 may obtain a plurality of routes via the wireless transceiver 821 and/or a wired interface.

The server 800, via one or more wired interfaces (not shown in FIG. 8) and/or one or more wireless transceivers 821, may obtain a plurality of location measurement reports from a plurality of devices, wherein the location measurement reports contain one or more parameters related to location measurements that correspond to the route or segment of the route, similar to block 510.

Also shown in FIG. 8, digital signal processor(s) (DSP(s)) 812 and general-purpose processor(s) 811 may be connected to memory 840 through bus 801. A particular bus interface (not shown) may be integrated with the DSP(s) 812, general-purpose processor(s) 811 and memory 840. In various implementations, functions may be performed in response to execution of one or more machine-readable instructions stored in memory 840 such as on a computer-readable storage medium, such as RAM, ROM, FLASH, or disc drive, just to name a few examples. The one or more instructions may be executable by general-purpose processor(s) 811, specialized processors, or DSP(s) 812. Memory 840 may comprise a non-transitory processor-readable memory and/or a computer-readable memory that stores software code (programming code, instructions, etc.) that are executable by processor(s) 811 and/or DSP(s) 812. The processor(s) 811 and/or the DSP(s) 812 may be used to perform various operations as described throughout the specification. For example, the processor(s) 811, the DSP(s) 812 and/or wireless transceiver 821 in conjunction with memory 840 may be used to obtain a plurality of routes to the destination, similar to block 210. The processor(s) 811 and/or the DSP(s) 812 in conjunction with memory 840 determine a route to use from the plurality of determined routes based on an estimated localization uncertainty of each route and/or localization reliability of each route, similar to block 220. The processor(s) 811 and/or the DSP(s) 812 in conjunction with memory 840 to obtain a plurality of location measurement reports from a plurality of devices, wherein the location measurement reports contain one or more parameters related to location measurements that correspond to a route and/or segment of the route, similar to block 510. The processor(s) 811 and/or the DSP(s) 812 in conjunction with memory 840 to determine one or more localization uncertainty parameters and localization reliability parameters for the route and/or segment of the route based on the plurality of location measurement reports that correspond to the route and/or segment of the route, similar to block 520.

Discussions of coupling between components in this specification do not require the components to be directly coupled. These components may be coupled directly or through one or more intermediaries. Additionally, coupling does not require they be directly attached, but it may also include electrically coupled, communicatively coupled or any combination thereof.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In another aspect, as previously mentioned, a wireless transmitter or access point may comprise a cellular transceiver device, utilized to extend cellular telephone service into a business or home. In such an implementation, one or more mobile devices may communicate with a cellular transceiver device via a code division multiple access ("CDMA") cellular communication protocol, for example.

Techniques described herein may be used with an SPS that includes any one of several GNSS and/or combinations of GNSS. Furthermore, such techniques may be used with positioning systems that utilize terrestrial transmitters acting as "pseudolites", or a combination of SVs and such terrestrial transmitters. Terrestrial transmitters may, for example, include ground-based transmitters that broadcast a PN code or other ranging code (e.g., similar to a GPS or CDMA cellular signal). Such a transmitter may be assigned a unique PN code so as to permit identification by a remote receiver. Terrestrial transmitters may be useful, for example, to augment an SPS in situations where SPS signals from an orbiting SV might be unavailable, such as in tunnels, mines, buildings, urban canyons or other enclosed areas. Another implementation of pseudolites is known as radio-beacons. The term "SV", as used herein, is intended to include terrestrial transmitters acting as pseudolites, equivalents of pseudolites, and possibly others. The terms "SPS signals" and/or "SV signals", as used herein, is intended to include SPS-like signals from terrestrial transmitters, including terrestrial transmitters acting as pseudolites or equivalents of pseudolites.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

For an implementation involving firmware and/or software, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

In view of this description embodiments may include different combinations of features. Implementation examples are described in the following numbered clauses:

Clause 1: A method of route selection to one or more destinations, the method comprising: receiving a starting point and the one or more destinations; transmitting a request to a server for routes associated with the starting point and the one or more destinations; receiving, from the server, a plurality of routes to the one or more destinations; and selecting a route from the plurality of routes based at least on one or more reliability parameters associated with each route of the plurality of routes, the one or more reliability parameters comprising a likelihood of determining a position location along each route, the likelihood being based at least on detectability of features in each route by one or more object detection modalities.

Clause 2: The method of clause 1, wherein the selecting of the route from the plurality of routes is further based on a localization uncertainty associated with each route, the localization uncertainty comprising an estimate of a positioning precision of the position location along a corresponding route.

Clause 3: The method of any of clauses 1-2 wherein the estimate of the positioning precision comprises horizontal dilution of precision (HDOP), vertical dilution of precision (VDOP), position dilution of precision (PDOP), geometric dilution of precision (GDOP), or any combination thereof.

Clause 4: The method of any of clauses 1-3 wherein the one or more object detection modalities include a radar equipped on a device, and the features in each route comprise radar-based markers detectable with the radar.

Clause 5: The method of any of clauses 1-4 wherein the one or more object detection modalities include a camera equipped on a device, and the features in each route comprise visual-based markers detectable with the camera.

Clause 6: The method of any of clauses 1-5 wherein the one or more object detection modalities include an ultrasound equipped on a device, and the features in each route comprise ultrasonic-based markers detectable with the ultrasound.

Clause 7: The method of any of clauses 1-6 wherein the one or more reliability parameters further comprise statistics related to false positives with respect to the features detected in each route; and the selecting of the route from the plurality of routes is further based on the statistics related to false positives.

Clause 8: The method of any of clauses 1-7 wherein the selecting of the route from the plurality of routes is further based on a required usage of the one or more object detection modalities to navigate each route, the required usage determined based on historic information relating to each route, current information relating to each route, or a combination thereof.

Clause 9: The method of any of clauses 1-8 wherein the selecting of the route from the plurality of routes is further based on time of day, devices registered to use each route, positioning capabilities of devices registered for each route or that historically use each route, or any combination thereof.

Clause 10: The method of any of clauses 1-9 further comprising obtaining one or more positioning capabilities of a device; wherein the selecting the route from the plurality of routes is further based on the one or more positioning capabilities of the device.

Clause 11: A device for route selection to one or more destinations, the device comprising: a memory; one or more transceivers configured to receive a starting point and the one or more destinations; and one or more processors coupled to the memory and the one or more transceivers, the one or more processors configured to: transmit a request to a server for routes associated with the starting point and the one or more destinations; receive, from the server, a plurality of routes to the one or more destinations; and select a route from the plurality of routes based at least on one or more reliability parameters associated with each route of the plurality of routes, the one or more reliability parameters comprising a likelihood of determining a position location along each route, the likelihood being based at least on detectability of features in each route by one or more object detection modalities.

Clause 12: The device of clause 11, wherein the selection of the route from the plurality of routes is further based on a localization uncertainty associated with each route, the localization uncertainty comprising an estimate of a positioning precision of the position location along a corresponding route.

Clause 13: The device of any of clauses 11-12 wherein the device comprises a radar, and the features in each route comprise radar-based markers detectable with the radar.

Clause 14: The device of any of clauses 11-13 wherein the device comprises a camera, and the features in each route comprise visual-based markers detectable with the camera.

Clause 15: The device of any of clauses 11-14 wherein the device comprises an ultrasound, and the features in each route comprise ultrasonic-based markers detectable with the ultrasound.

Clause 16: The device of any of clauses 11-15 wherein the selection of the route from the plurality of routes is further based on a required usage of the one or more object detection modalities to navigate each route, the required usage determined based on historic information relating to each route, current information relating to each route, or a combination thereof.

Clause 17: A device for route selection to one or more destinations, the device comprising: means for receiving a starting point and the one or more destinations; means for transmitting a request to a server for routes associated with the starting point and the one or more destinations; means for receiving, from the server, a plurality of routes to the one or more destinations; and means for selecting a route from the plurality of routes based at least on one or more reliability parameters associated with each route of the plurality of routes, the one or more reliability parameters comprising a likelihood of determining a position location along each route, the likelihood being based at least on detectability of features in each route by one or more object detection modalities.

Clause 18: The device of clause 17, wherein the means for selecting the route from the plurality of routes are further based on a localization uncertainty associated with each route, the localization uncertainty comprising an estimate of a positioning precision of the position location along a corresponding route.

Clause 19: The device of any of clauses 17-18 wherein the one or more object detection modalities include a radar equipped on the device, and the features in each route comprise radar-based markers detectable with the radar.

Clause 20: The device of any of clauses 17-19 wherein the one or more object detection modalities include a camera equipped on the device, and the features in each route comprise visual-based markers detectable with the camera.

Clause 21: The device of any of clauses 17-20 wherein the one or more object detection modalities include an ultrasound equipped on the device, and the features in each route comprise ultrasonic-based markers detectable with the ultrasound.

Clause 22: The device of any of clauses 17-21 wherein the means for selecting the route from the plurality of routes are further based on a required usage of the one or more object detection modalities to navigate each route, the required usage determined based on historic information relating to each route, current information relating to each route, or a combination thereof.

Clause 23: The device of any of clauses 17-22 wherein the means for selecting the route from the plurality of routes are further based on time of day, devices registered to use each route, positioning capabilities of devices registered for each route or that historically use each route, or any combination thereof.

Clause 24: A non-transitory computer-readable apparatus comprising a storage medium, the storage medium comprising processor-executable program code configured to cause one or more processors to: receive a starting point and one or more destinations; transmit a request to a server for routes associated with the starting point and the one or more destinations; receive, from the server, a plurality of routes to the one or more destinations; and select a route from the plurality of routes based at least on one or more reliability parameters associated with each route of the plurality of routes, the one or more reliability parameters comprising a likelihood of determining a position location along each route, the likelihood being based at least on detectability of features in each route by one or more object detection modalities.

Clause 25: The non-transitory computer-readable apparatus of clause 24, wherein the selection of the route from the plurality of routes is further based on a localization uncertainty associated with each route, the localization uncertainty comprising an estimate of a positioning precision of the position location along a corresponding route.

Clause 26: The non-transitory computer-readable apparatus of any of clauses 24-25 wherein the one or more object detection modalities include a radar equipped on a device, and the features in each route comprise radar-based markers detectable with the radar.

Clause 27: The non-transitory computer-readable apparatus of any of clauses 24-26 wherein the one or more object detection modalities include a camera equipped on a device, and the features in each route comprise visual-based markers detectable with the camera.

Clause 28: The non-transitory computer-readable apparatus of any of clauses 24-27 wherein the one or more object detection modalities include an ultrasound equipped on a device, and the features in each route comprise ultrasonic-based markers detectable with the ultrasound.

Clause 29: The non-transitory computer-readable apparatus of any of clauses 24-28 wherein the selection of the route from the plurality of routes is further based on a required usage of the one or more object detection modalities to navigate each route, the required usage determined based on historic information relating to each route, current information relating to each route, or a combination thereof.

Clause 30: The non-transitory computer-readable apparatus of any of clauses 24-29 wherein the selection of the route from the plurality of routes is further based on time of day, devices registered to use each route, positioning capabilities of devices registered for each route or that historically use each route, or any combination thereof.

What is claimed is:

1. A method of route selection to one or more destinations by a device, the method comprising:
    receiving a starting point and the one or more destinations;
    transmitting a request to a server for routes associated with the starting point and the one or more destinations;
    receiving, from the server, a plurality of routes to the one or more destinations; and
    selecting a route from the plurality of routes based at least on one or more reliability parameters associated with each route of the plurality of routes, the one or more reliability parameters comprising a likelihood of determining, by the device, a position location of the device along each route, the likelihood being based at least on detectability of features in each route by one or more object detection modalities.

2. The method of claim 1, wherein the selecting of the route from the plurality of routes is further based on a localization uncertainty associated with each route, the localization uncertainty comprising an estimate of a positioning precision of the position location along a corresponding route.

3. The method of claim 2, wherein the estimate of the positioning precision comprises horizontal dilution of precision (HDOP), vertical dilution of precision (VDOP), position dilution of precision (PDOP), geometric dilution of precision (GDOP), or any combination thereof.

4. The method of claim 1, wherein the one or more object detection modalities include a radar equipped on the device, and the features in each route comprise radar-based markers detectable with the radar.

5. The method of claim 1, wherein the one or more object detection modalities include a camera equipped on the device, and the features in each route comprise visual-based markers detectable with the camera.

6. The method of claim 1, wherein the one or more object detection modalities include an ultrasound equipped on the device, and the features in each route comprise ultrasonic-based markers detectable with the ultrasound.

7. The method of claim 1, wherein:
    the one or more reliability parameters further comprise statistics related to false positives with respect to the features detected in each route; and
    the selecting of the route from the plurality of routes is further based on the statistics related to false positives.

8. The method of claim 1, wherein the selecting of the route from the plurality of routes is further based on a required usage of the one or more object detection modalities to navigate each route, the required usage determined based on historic information relating to each route, current information relating to each route, or a combination thereof.

9. The method of claim 1, wherein the selecting of the route from the plurality of routes is further based on time of day, devices registered to use each route, positioning capabilities of devices registered for each route or that historically use each route, or any combination thereof.

10. The method of claim 1, further comprising obtaining one or more positioning capabilities of the device;
    wherein the selecting the route from the plurality of routes is further based on the one or more positioning capabilities of the device.

11. A device for route selection to one or more destinations, the device comprising:
    a memory;
    one or more transceivers configured to receive a starting point and the one or more destinations; and
    one or more processors coupled to the memory and the one or more transceivers, the one or more processors configured to:
        transmit a request to a server for routes associated with the starting point and the one or more destinations;
        receive, from the server, a plurality of routes to the one or more destinations; and
        select a route from the plurality of routes based at least on one or more reliability parameters associated with each route of the plurality of routes, the one or more reliability parameters comprising a likelihood of determining, by the device, a position location of the device along each route, the likelihood being based at least on detectability of features in each route by one or more object detection modalities.

12. The device of claim 11, wherein the selection of the route from the plurality of routes is further based on a localization uncertainty associated with each route, the localization uncertainty comprising an estimate of a positioning precision of the position location along a corresponding route.

13. The device of claim 11, wherein the device comprises a radar, and the features in each route comprise radar-based markers detectable with the radar.

14. The device of claim 11, wherein the device comprises a camera, and the features in each route comprise visual-based markers detectable with the camera.

15. The device of claim 11, wherein the device comprises an ultrasound, and the features in each route comprise ultrasonic-based markers detectable with the ultrasound.

16. The device of claim 11, wherein the selection of the route from the plurality of routes is further based on a required usage of the one or more object detection modalities to navigate each route, the required usage determined based on historic information relating to each route, current information relating to each route, or a combination thereof.

17. A device for route selection to one or more destinations, the device comprising:
    means for receiving a starting point and the one or more destinations;
    means for transmitting a request to a server for routes associated with the starting point and the one or more destinations;
    means for receiving, from the server, a plurality of routes to the one or more destinations; and
    means for selecting a route from the plurality of routes based at least on one or more reliability parameters associated with each route of the plurality of routes, the one or more reliability parameters comprising a likelihood of determining, by the device, a position location of the device along each route, the likelihood being based at least on detectability of features in each route by one or more object detection modalities.

18. The device of claim 17, wherein the means for selecting the route from the plurality of routes are further based on a localization uncertainty associated with each route, the localization uncertainty comprising an estimate of a positioning precision of the position location along a corresponding route.

19. The device of claim 17, wherein the one or more object detection modalities include a radar equipped on the device, and the features in each route comprise radar-based markers detectable with the radar.

20. The device of claim 17, wherein the one or more object detection modalities include a camera equipped on the device, and the features in each route comprise visual-based markers detectable with the camera.

21. The device of claim 17, wherein the one or more object detection modalities include an ultrasound equipped on the device, and the features in each route comprise ultrasonic-based markers detectable with the ultrasound.

22. The device of claim 17, wherein the means for selecting the route from the plurality of routes are further based on a required usage of the one or more object detection modalities to navigate each route, the required usage determined based on historic information relating to each route, current information relating to each route, or a combination thereof.

23. The device of claim 17, wherein the means for selecting the route from the plurality of routes are further based on time of day, devices registered to use each route, positioning capabilities of devices registered for each route or that historically use each route, or any combination thereof.

24. A non-transitory computer-readable apparatus comprising a storage medium, the storage medium comprising processor-executable program code configured to cause one or more processors of a device to:
   receive a starting point and one or more destinations;
   transmit a request to a server for routes associated with the starting point and the one or more destinations;
   receive, from the server, a plurality of routes to the one or more destinations; and
   select a route from the plurality of routes based at least on one or more reliability parameters associated with each route of the plurality of routes, the one or more reliability parameters comprising a likelihood of determining, by the device, a position location of the device along each route, the likelihood being based at least on detectability of features in each route by one or more object detection modalities.

25. The non-transitory computer-readable apparatus of claim 24, wherein the selection of the route from the plurality of routes is further based on a localization uncertainty associated with each route, the localization uncertainty comprising an estimate of a positioning precision of the position location along a corresponding route.

26. The non-transitory computer-readable apparatus of claim 24, wherein the one or more object detection modalities include a radar equipped on the device, and the features in each route comprise radar-based markers detectable with the radar.

27. The non-transitory computer-readable apparatus of claim 24, wherein the one or more object detection modalities include a camera equipped on the device, and the features in each route comprise visual-based markers detectable with the camera.

28. The non-transitory computer-readable apparatus of claim 24, wherein the one or more object detection modalities include an ultrasound equipped on the device, and the features in each route comprise ultrasonic-based markers detectable with the ultrasound.

29. The non-transitory computer-readable apparatus of claim 24, wherein the selection of the route from the plurality of routes is further based on a required usage of the one or more object detection modalities to navigate each route, the required usage determined based on historic information relating to each route, current information relating to each route, or a combination thereof.

30. The non-transitory computer-readable apparatus of claim 24, wherein the selection of the route from the plurality of routes is further based on time of day, devices registered to use each route, positioning capabilities of devices registered for each route or that historically use each route, or any combination thereof.

* * * * *